March 13, 1962    L. L. CUNNINGHAM    3,025,484
MODULATING THERMOSTAT

Original Filed Aug. 13, 1956                                         2 Sheets-Sheet 1

INVENTOR

LEWIS L. CUNNINGHAM

BY

ATTORNEY

March 13, 1962 L. L. CUNNINGHAM 3,025,484
MODULATING THERMOSTAT
Original Filed Aug. 13, 1956 2 Sheets-Sheet 2

INVENTOR
LEWIS L. CUNNINGHAM
BY
ATTORNEY

United States Patent Office 3,025,484
Patented Mar. 13, 1962

3,025,484
MODULATING THERMOSTAT
Lewis L. Cunningham, 119 N. Gordon Way,
Los Altos, Calif.
Original application Aug. 13, 1956, Ser. No. 605,915, now Patent No. 2,959,352, dated Nov. 8, 1960. Divided and this application June 13, 1960, Ser. No. 44,488
5 Claims. (Cl. 338—31)

This application is a division of applicant's application S.N. 605,915, now Patent No. 2,959,352, filed August 13, 1956, by him on his invention of a "Fuel Gas Control System."

The present application includes claims to an invention of a modulating space thermostat as first disclosed in S.N. 605,915 and here further described.

In the preferred form here shown for the practice of my invention there is illustrated and described a modulating main valve for the control of fuel gas supplied to a gas burner for a heater for a space together with a novel and useful thermostat for modulatingly controlling the main valve in response to the variation in temperature within the space.

It is a primary object of this invention to provide a control system with an improved novel and useful thermostat for modulatingly controlling the supply of a fluid to a fluid utilization equipment in response to a condition responsive to the utilization of the fuel by the equipment.

It is a second object to provide such a system with such a mechanism having means on said mechanism for modulatingly controlling a separately modulated part of said fuel supply and means away from said mechanism for modulatingly controlling in response to a condition the means on said mechanism for modulatingly controlling said separately modulated part of said fuel supply.

It is a third object to provide such a system with electrically modulated valve means for controlling the separately modulated part of said fluid supply and means including a fluid filled bellows means variable in one dimension in response to a condition for automatically controlling the electricity supply to said electrically modulated valve means.

It is a fourth object to provide such a system with means including a valve means for separately modulating said separately modulated part of said fluid supply, biasing means for biasing said valve means toward the open position thereof, electric wire means strained longitudinally to restrain said biasing means, means including an electric source and a variable resistor in a circuit with said electric wire means and means including a fluid filled bellows means for varying the resistance of said resistor in response to a condition to vary the current through said electric wire to vary the temperature of the electric wire to vary the length of the electric wire to modulate the opening of the valve means.

It is a fifth object to provide such a system having a modulating main valve for a fluid supply for a variable fluid load, means operable by a separately modulated part of said fluid supply to modulate the main valve, electric means for modulating said separately modulated part of said fluid supply and a modulating thermostat remote from said electric means for modulating the current supply to the electric means in response to a condition.

It is a sixth object to provide such a system with such an electric modulating means and such a thermostat including a cover, a cup shaped hollow partially liquid filled belows sealed at its open end in metallic contact with the inner face of the shell and with the liquid of said fill being in contact with the inner face of said shell together with means movable by the end of said bellows away from the shell in response to the temperature change of the shell to modulate the electric current supplied to said hot wire means.

It is a seventh object to provide such a system with a thermostat having a circuit adapted to be connected in series by external conductors with said electric means and a source of electric power and including in series within the thermostat a variable resistor positioned within said shell away from the bellows, another resistor within said shell adjacent the end of said bellows away from the shell and means adapting said bellows to vary the resistance of said variable resistor in response to the temperature variation of the shell of the thermostat.

How these and other objects are attained is explained in the following description referring to the attached drawings in which.

Like reference numerals refer to like parts in the several figures of the drawings.

Figure 1:
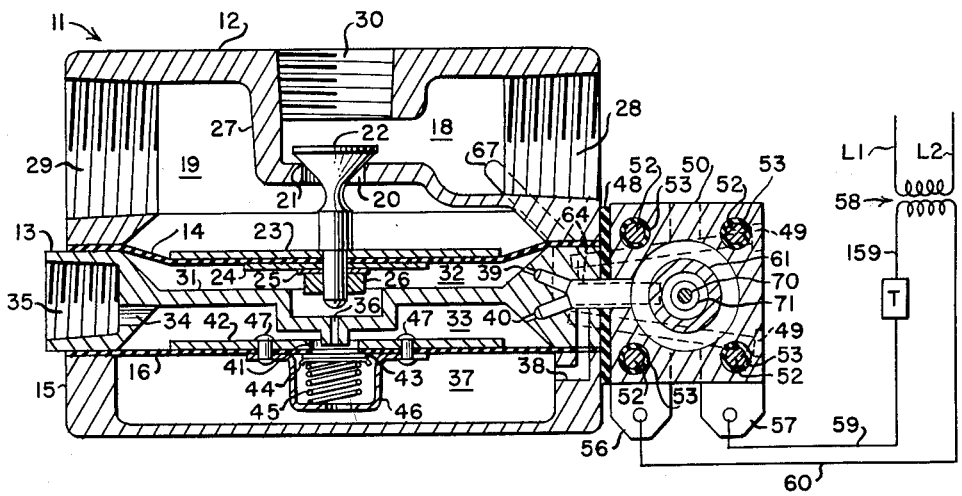
FIG. 1 is a vertical sectional view of the main valve and control valve mechanism of this invention viewed along the line 1—1 of FIG. 2.
Figure 2:
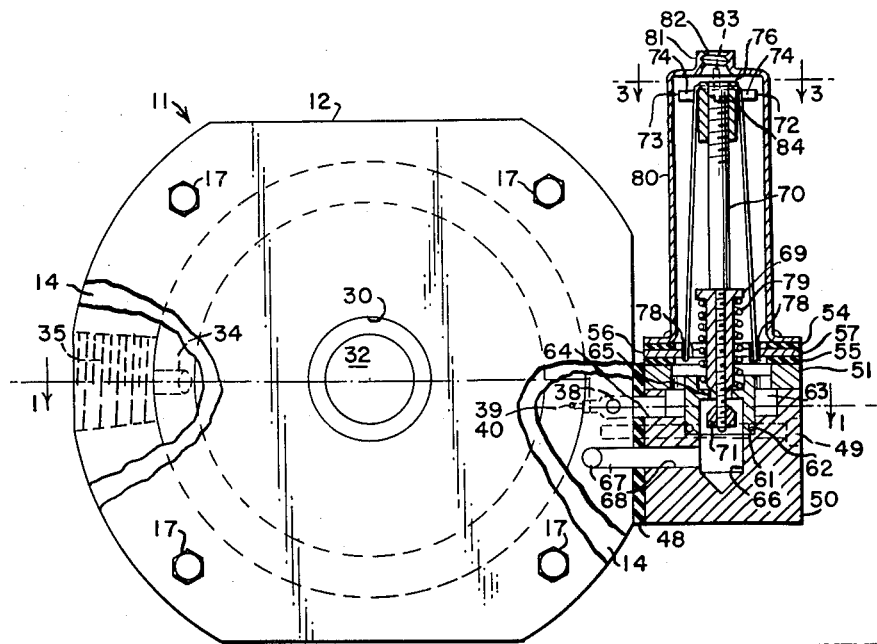
FIG. 2 is a top plan view in partial section of the main and control valve mechanisms of FIG. 1.

Referring now to the drawings, shown generally as 11 in FIGS. 1 and 2 is a modulating type of control valve mechanism having a hollow body made of three parts, an upper part 12 separated from a middle part 13 by a flexible diaphragm 14 and a lower part 15 separated from part 13 by a second flexible diaphragm 16. Screws 17 hold the parts and diaphragms in assembly.

Transverse barrier 27 in part 12 isolates inlet chamber 18 and together with baffle 14 isolates outlet chamber 19. Main valve port 20 finished on its inlet side with main valve seat 21 connects inlet chamber 18 with outlet chamber 19. Main valve 22 secured to diaphragm 14 by disks 23, 24, washer 25 and nut 26, as shown, is gravitationally biased toward its position of closure on valve seat 21. The main fluid flow from its supply to its load is through inlet opening 28, inlet chamber 18, valve port 20, outlet chamber 19 and outlet opening 29. Opening 30 from chamber 18 is a construction opening and is normally plugged.

Transverse barrier 31 in part 13 with diaphragm 14 isolates control chamber 32 and with diaphragm 16 isolates exhaust chamber 33 open to atmosphere through channel 34 and exhaust opening 35. Exhaust port 36 through barrier 31 connects control chamber 32 with exhaust chamber 33.

Diaphragm 16 isolates control antechamber 37 in body part 15 although control antechamber 37 is extended into body part 13 by channel 38 as will be referred to later. Channel 38 connects with chambers 32 and 33 through restricted orifice ports 39 and 40 respectively.

Exhaust port 41 formed through diaphragm 16 and disk 42 connects control antechamber 37 with exhaust chamber 33. Exhaust valve disk 43 supported on spring cup 44 as shown is biased toward its position of closure on diaphragm 16 to close port 41 by spring 45 supported on stirrup 46 secured to diaphragm 16 and disk 42 by rivets 47. Exhaust valve disk 43 is seen to be gravitationally biased away from its position of closure over the lower end of exhaust port 36 in barrier 31 by weighted diaphragm 16.

Figure 3:
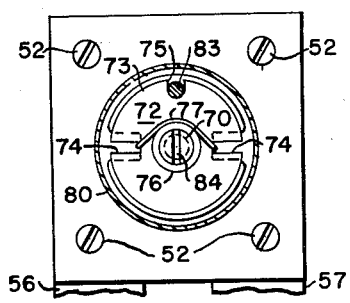
FIG. 3 is an elevation in partial section along the line 3—3 of FIG. 2.

Now referring to FIGS. 1, 2 and 3, there is seen sealed to body parts 12, 13 and 14 by gasket 48 and secured by screws 49 a control valve body formed of parts 50 and 51 secured together by screws 52 electrically insulated from part 51 by tubes 53. Individually electrically insulated by tubes 53 and sheets 54, 55 and secured to body part 51 by screws 52 are electric terminal strips 56, 57 to be connected in series by wires 59, 60 with an electric power source L, L2 through a transformer 58 and the space thermostat T shown in detail in FIGS. 4, 5 and 6.

Control valve body part 50 is seen to have a three step hole sunk therein with the intermediate step having control valve seat block 61 slidably sealed therein by O-ring 62. Valve seat block 61 is shown as a part of body part 51. The open end step 63 of the three step hole in block 61 is connected by lateral opening 64 and channel 38 to control antechamber 37 to form a further extension thereof connected through the hollow interior of body part 51 with one end of control valve port 65 formed axially through valve seat block 61 the other end of which opens into the smallest diameter closed end step 66 of the three step hole in body part 50.

Main valve inlet chamber 18 is seen to be connected to control antechamber 37 by channel 67 through main valve body parts, 12, 13, channel 68 in control valve body part 50, hole part 66 in part 50, control valve port 65 in valve seat block 61, the interior of control body part 51, hole part 63 and channel 64 in part 50 and channel 38. Thus control antechamber 37, channel 38 and hole part 63 are continuously subjected to the main line fluid pressure from inlet chamber 18 as throttled through control valve port 65 connected with chamber 18 by channels 67, 68 and hole 66.

Gas burners with which the present system is designed to be used are designed to operate at maximum capacity at a specified maximum pressure of, say, 3.5 inches w.c. and will operate reliably at about one-fifth of maximum capacity. Since the flow of gas to the burner is proportional to the square root of the pressure the minimum pressure at which the burner should be operated would be one twenty-fifth of 3.5 or .14 inches w.c.

In order to insure a sufficient operating pressure at the customer's installation as the load on the gas supply system varies the utility company maintains a gas pressure on the customer's service of, say, 7 inches w.c. which pressure is usually reduced on the customer's premises by a pressure regulator and maintained at about the rated maximum pressure of the burner (about 3.5 inches w.c.).

The present main valve control mechanism is designed to limit the modulation pressure range of gas supplied to a burner within specified operating limits, i.e. .14 to 3.5 inches w.c., and between these limits to modulate the gas pressure at the burner to the heat required to be supplied by the burner.

Thus assuming that the burner pilot light safety equipment is in good order and the pilot light is in condition to ignite any gas going to the burner from outlet chamber 19 and that control port 65 is being opened by mechanism responsive to a call for heat at the burner, gas at inlet chamber pressure flows to control antechamber 37, 38 and through restricted orifices 39, 40 into control chamber 32 and exhaust chamber 33. Orifice 40 is a continuous bleed restriction since in normal operation chambers 32 and 37 are dead ended and if there were no bleed orifice 40 and if control port 65 were suddenly closed due to a fulfillment of the need for any heat, or an emergency condition, valve 22 would be maintained in open or heat supply position.

With the mechanism of main valve 11 in the shut down position of FIG. 1, when the control port 65 is opened as above noted, gas under approximately inlet pressure flows from antechamber 37, 38 through orifice 40 to atmosphere and through orifice 39 and exhaust port 36 to atmosphere and continues to do so until the gas pressure in space 37 builds up to a safe starting value, diaphragm 16 being gravitationally loaded to bias exhaust valve disk 43 away from exhaust port 36 up to this pressure in space 37. When the pressure in space 37 rises to the pre-set value noted diaphragm 16 lifts exhaust valve 43 to close on port 36 and the full pressure of the gas in space 37, 38 is soon felt in space 32 to bear on the underside of diaphragm 14 to lift diaphragm 14 against its gravitational bias and lift main valve 22 off its seat 21 and allow load gas to pass to the burner through main valve port 20. It is to be noted that the operation of the main valve is reactionary or stabilized by the back pressure of outlet gas in chamber 19 on the top of diaphragm 14. Thus when more heat is required control port 65 will be opened further to increase the pressure under diaphragm 14 to lift main valve 22 further off its seat 21 and pass more gas to outlet space 19 and the load. But passing more gas to space 19 increases the reaction pressure of this gas on the top of diaphragm 14 which settles quickly and quietly to its new position required by the increase in pressure in space 32.

Should the inlet gas pressure become unusually high at a time when the burner is asked to supply all the heat it can and control valve port 65 is wide open, it is seen that the burner might operate at a dangerous rate if it were not for spring 45 biasing exhaust valve 43 against the lower end of exhaust port 41. Spring 45 is selected such that within a safe upper limit of pressure in space 37 with valve disk 43 pressed against the lower end of port 36, diaphragm 16 will be lifted off valve disk 43 and port 41 will be opened to bleed space 37 to atmosphere thus holding the control pressure in spaces 38 and 32 and therefore in space 19 within the required limit of burner pressure.

It is thus seen how, powered by gas under pressure from inlet chamber 18, valve mechanism 11 will modulate fuel gas flow to a burner in response to the modulation of opening of control port 65 and at the same time restrict the operation of the burner to within safe operating gas pressure limits.

A preferred way for modulating the opening of control valve port 65 in response to a condition is shown in FIGS. 1 to 6 inclusive in which a fluid fill bellows type of thermostat T designed to be remotely spaced from the burner in a space heated by the burner is used to modulate an electric current traversing an electric wire whose length is a function of its temperature and whose temperature is a function of the electric current it passes.

The hot wire modulator for control port 65 is shown in FIGS. 1 to 3 to include a valve 69 threadedly secured in axial position on valve stem 70 and a safety valve 71 secured to stem 70. Internally threaded ceramic cap 72 threadedly positionable axially on the extended end of stem 70 is formed with a normally extending collar 73 formed with a pair of diametrically positioned slots 74, an additional slot 75 and a short extension 76. Electric resistance wire 77 having a relatively high thermal co-efficient of expansion is seen to be looped around extension 76 of cap 72 and extended through slots 74 to have its ends secured electrically and mechanically at 78 to terminal straps 56, 57. Making the valve stem 70 of material having the same temperature co-efficient of expansion as has wire 77 compensates the mechanism for ambient temperature change. Wire 77 is strained longitudinally by spring 79 biasing valve 69 away from its position of closure of port 65 and biasing valve 71 toward its position of closure of port 65. Note that if wire 77 should break spring 79 will close valve 71 or port 65 and shut down the flow of fuel gas to the burner.

Hot wire mechanism cover 80 has a flanged open end secured in place by screws 52 and an extended end formed with a threaded collar 81 surrounding an adjustment access hole 82 which is normally fitted with a sealing plug, not shown. Offset from collar 81 and extending inwardly from the end of cover 80 is a detent rivet 83 extending through slot 75 to prevent cap 73 from rotating. The extended end of valve stem 70 is formed with a screw driver slot 84 engageable by a screw driver extending inwardly through hole 82 in cover 20 for the purpose of rotating valve stem 70 in cap 73 manually to position valve 69 at a desired position with respect to port 65 at a selected current through wire 77. It is seen that after calibration as desired the hot wire mechanism shown will position valve 69 with respect to port 65 and control the main valve mechanism to modulate the flow of fuel gas to the burner in response to the temperature of wire 77, the temperature of wire 77 being modulatingly controlled in response to the space heated by the burner by thermostat T positioned in the control electric circuit, as shown in FIG. 1, between wires 59 and 159 and shown in essential detail in FIGS. 4, 5 and 6.

Thermometer T is shown with an insulating wall mounting base 85 having holes, not shown, formed therethrough to receive wall mounting screws. Secured to base 85 by rivets 86 are a pair of contact straps 87, 88 to which external circuit wires 59, 159 are respectively attached by terminal screws 89, 90. Wires 59, 159 pass through hole 91 formed through base 85.

Figure 4:
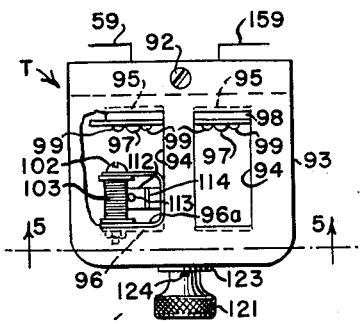
FIG. 4 is a top plan view in partial section of the modulating thermostat of this invention positioned at T in FIG. 1.
Figure 5:
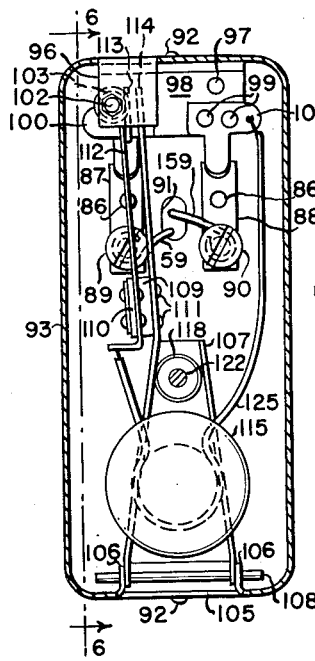
FIG. 5 is a front elevation in partial section along the line 5—5 of the thermostat of FIG. 4.
Figure 6:
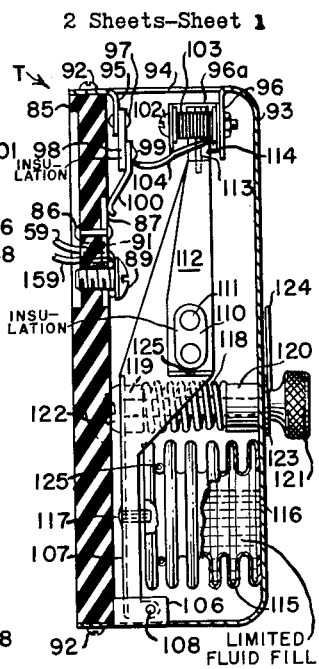
FIG. 6 is a side elevation in partial section along the line 6—6 of the thermostat of FIG. 5.
Figure 7:
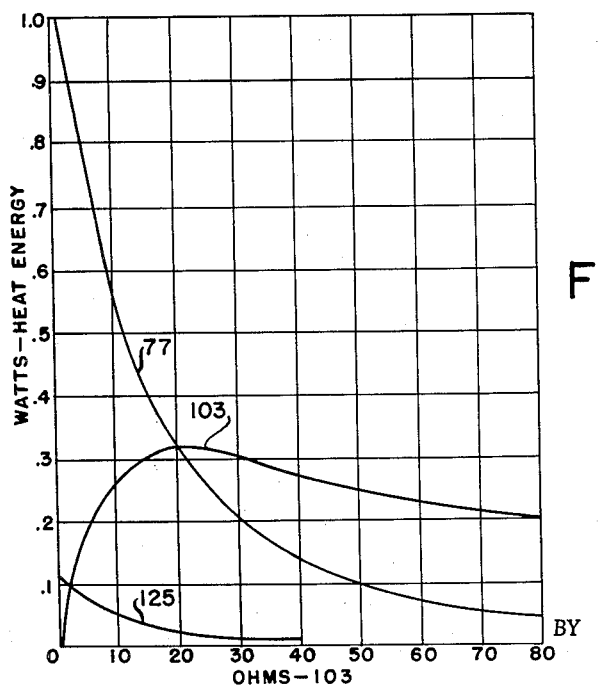
FIG. 7 is a graph showing the variation of electric heat in the two resistor elements of the thermostat and the hot wire with variation of the resistance of the variable resistor element of the thermostat.

Secured to mounting base 85 by top and bottom screws 92 is thermostat cover 93 which uniquely carries all of the functional parts of the thermostat. As shown in FIGS. 4, 5 and 6, ambient air circulation holes 94 in the top of thermostat cover 93 are formed by slitting the cover and displacing the metal to form a pair of ears 95 bent inwardly near the open side of cover 93 and an ear 96 bent inwardly near the closed front of cover 93. To ears 95, rivets 97 secure insulating board 98 to which in turn by rivets 99 spring contact clips 100, 101 are secured in spring contact respectively with contact straps 87, 88. Insulatedly secured to ear 96 by screw 102 as shown is a coil 103 of wire having a resistance, for instance, of about 80 ohms. The end of coil 103 nearest ear 96 is secured to clip 100 by wire 104 as shown.

Ambient air circulating hole 105 in the bottom of thermostat cover 93 is formed by slitting the metal, removing some and turning inwardly the flanges 106 to which lever 107 is hinged, as shown, by pin 108. Insulatedly secured to lever 107 by insulators 109, 110 and rivets 111 is flexible conducting lever 112 carrying wiping contact rod 113 in sliding contact with coil 103.

Of particular interest is U-shaped clip or bracket 96a secured by screw 102 into intimate contact with the supporting structure of coil 103 and ear 96 formed of the inwardly bent cover material displaced to form one of the holes 94 in the top of cover 93. Bracket 96a is formed to be secured around end 114 of lever 107 and shaped to limit the throw of lever 107 by bellows 115 to fix the limit positions of contact end 113 of lever 112 with respect to coil 103. Again bracket 96a as mounted is a good thermal contact with coil 103 and much of the heat generated in coil 103 is conducted directly to bracket 96a to be dissipated to the surrounding air. Bracket 96a is in edgewise contact with vertical currents of air and the heat is delivered efficiently to the air, thereby effectively promoting air circulation through the thermostat and increasing its sensitivity.

Hollow bellows 115 is soldered and sealed at its open end to the front of cover 93 as shown at 116. The closed end of bellows 115 is secured to lever 107 by an internally threaded hollow rivet 117. In one form of my invention, bellows 115 contains a partial fill of ethyl chloride limited to be fully evaporated at 100° F. (Fills of this type for selected temperatures are well known in the art.) Above that temperature then the increase in pressure within the bellows with respect to an increase in temperature is at a slower rate or approximately proportional to the absolute temperature. At all temperatures below this complete evaporation temperature some dew is present in the bellows and it will always be condensed or evaporated at the point of lowest temperature within the bellows. The pressure within the bellows is a function of the lowest temperature within the bellows. The sensitive surface on the bellows is the surface area of lowest temperature. The use of a limited fill is conventional and the properties for some suitable fluids are well known. Below the temperature of complete evaporation the pressure change per degree Fahrenheit at 70 degrees is approximately, .4 p.s.i. The force of bellows 115 exerted on lever 107 is opposed by compression spring 118 strained between cover 93 and lever 107 by spacers 119 and 120. Knurled nut 121 threaded on to screw 122 secured to lever 107 and spaced from the front face of cover 93 by thrust washer 123, after calibration with pointer 124 and a dial, not shown, on the front of cover 93, will determine the temperature to be held in the space to be heated.

For purposes to be explained insulated resistance wire 125 is placed in the annular groove of bellows 115 nearest its end away from cover 93 and has its ends connected to clip 101 and contact lever 112 respectively. The internal electric circuit of the thermostat T then includes in series between terminal screws 89 and 90, contact straps 87, 88 contact clips 100, 101, fixed resistor wire 125, variable resistor 103, wire 104 and contact lever 112 with sliding contact 113. External to thermostat T the circuit includes transformer 58 wires 59, 159 terminal straps 56, 57 and hot wire 77. It is seen that in normal service the electric circuit is continuously energized and always includes, in series, hot wire 77, fixed resistor 125 and variable resistor 103 whose included resistance is increased by lever 112 and contact 113 as the space to be heated warms up and bellows 115 expands on a rise in temperature. Conversely as the space to be heated cools and bellows 115 contracts sliding contact 113 is moved to decrease the included resistance of resistor 103.

In FIG. 8 are shown the variations of power input in watts to each of the resistances, hot wire 77, wire 125, and variable resistor 103 as the included resistance of resistor 103 is varied from 0 to approximately 80 ohms. It is seen that when resistor 103 is at its lowest included resistance or short circuited hot wire 77 is energized with about 1 watt of power to open control valve port 65 to a maximum and wire 125 applies something up to one tenth of a watt of heat to the end of bellows 115 away from cover 93. The heat dissipated by resistor 103 is mainly effective in reinforcing the ambient air convention currents through the thermostat case.

The novel construction feature of soldering the bellows 115 directly to cover 93 provides a fundamental improvement in thermostats. To serve its purpose a thermostat should respond as promptly as possible to changes in environmental temperature. The cover 93 is in direct contact with the ambient air and exposed to radiant heat exchange with the wall and furniture surfaces visible from its location. Thus the cover temperature is the best possible criterion of the comfort conditions in the room. In the construction shown the vapor contained in the bellows is in direct contact with cover 93 and, on cooling from an established equilibrium, the response is prompt for condensation takes place in the bellows on the back face of cover 93. Then the internal pressure of the bellows is proportional to the temperature of cover 93 because the other portions of the bellows structure lag in temperature drop and are at a higher temperature than cover 93.

However on a rising ambient temperature the cover temperature rises faster than the temperatures at other surfaces of the bellows structure and the most laggard or coolest surface will be the surface controlling the evaporation of bellows liquid and therefore the surface controlling the pressure in the bellows which is the force which indicates to the system the alleged temperature change of the space and which proceeds to modify the control system conditions to reduce the heat supply to the space. To compensate the system for thermostat lag I have added the fixed resistor 125 in close contact with the part of the bellows 115 away from cover 93. I call resistor 125 an accelerator resistance for it accelerates the effective response of the thermostat and causes the burner closely to follow the heating needs of the space. One way it does this is by keeping the other parts of the bellows a little warmer than the cover 93 so that the cover 93 temperature always is the temperature of condensation or evaporation of the ethyl chloride in the bellows.

Returning to the graphs of FIG. 8, the abscissae of all of the curves are the smoothly variable included values of resistance of variable resistor 103 as slider 113 progresses over the surface of resistor 103 from its wire 104 or zero resistance end to near its other end where a resistance of 80 ohms is included. Variable resistor 103, accelerator resistor 125 and hot wire resistor 77 which controls the opening of control gas orifice 65 are at all times in series with power supply transformer. As shown by the ordinate scale of the curves the several resistances as found to be satisfactory for the particular system here shown are such that when the room temperature has dropped sufficiently for slider 113 to have reduced the part of resistor 103 included in the circuit to zero then the current through the circuit will be such that the heating rate of hot wire 77 will be 1 watt and the heating rate of accelerator resistor 125 will be one-tenth watt. With a heating rate of one watt hot wire 77 will elongate to allow spring 79 to lift valve 69 away from port 65 to supply sufficient control gas to space 37, 38, 32 to open valve 22 off its seat 21 to supply the burner with its rated supply of fuel gas. At this maximum burning rate of the burner it is seen that accelerator 125 will be supplying one tenth watt to the bellows to "accelerate" the thermostat's response to the fact that heat is being supplied to the space or to "anticipate" the effect on the thermostat of heat being supplied to the space as well as to require that the cover end of bellows 115 will be the cool or sensitive end even though the ambient temperature is rising. The curves show how as the space temperature rises and slider 113 moves to include more and more resistance in resistor 103 in the circuit, less heat is supplied to hot wire 77 so that less gas will be supplied to the burner and accelerator 125 also will be supplied heat at a diminishing rate as is desirable.

As above noted the heat from resistor 103 is mainly useful in improving the convection circulation of ambient air through the thermostat case but by radiation and conduction some of the heat from resistor 103 heats the thermostat generally. In the case shown this heat decreases both ways from an included resistance value of about 20 ohms in rheostat 103 which is in the normal operating range. This lessened supply of heat from rheostat 103 as the heat required moves either way from a median demand causes the thermostat to require that a little more heat be supplied to the space than is actually required. This is desirable to prevent undershooting of room temperature following by too great a supply of heat when the thermostat realizes the need for heat. However under conditions of full demand, as noted, the rheostat 103 heat falls to zero and in the absence of other heat it would be necessary for the room temperature to overshoot to satisfy the thermostat. The accelerator heat, shown by curve 125 of FIG. 8 takes care of this situation, in spite of the fact that its amount is much less than that supplied by rheostat 103 at its median resistance position, for the reason that the accelerator heat is delivered directly to the bellows with relatively high heat transfer efficiency. The net combined effect of the two sources of heat (103 and 125) when properly proportioned as shown is to anticipate and prevent delivery of excessive heat from the furnace at the "cool" end of the differential and also to anticipate and prevent a deficiency at the "warm" end. It is not possible for any of the prior art thermostat systems known to me to make these automatic adjustments which are so necessary to successful use of any type of heating control system and particularly to the use of a modulating control system.

It is to be understood that, as described, thermostat T is critically sensitive to the fuel requirement for operation of a gas burner supplying heat to a space in which the thermostat is located. The thermostat translates the instantaneously varying value of the fuel requirement into an electric current having a similarly instantaneously varying value. The working load at hot wire 77 of the current flowing from the secondary winding of transformer 58 through transformer T and hot wire 77 is governed by control of the voltage drop across hot wire 77 by the varying part of the voltage at transformer 58 taken up by transformer T.

Then it is understood that the real function of thermostat T is to vary its internal resistance as an accurate function of the integrated temperature forces to which it is exposed and this continuous indication of this integration of these forces can be used for any desired purpose in any desired system of direct or relaying controls.

Having thus recited some of the objects of my invention, illustrated and described a novel and useful way in which my invention may be practiced and explained its operation, I claim:

1. A modulating space thermostat comprising a shell adapted to be supported in a space in heat exchange relation with the air in said space and the exposed inner wall surfaces of said space, a limited fluid fill bellows sealed at one end to the inner surface of said shell with the fluid of said fill in contact with said inner surface of said shell, a lever pivoted at one end within said shell, means pivoting said lever between its ends over the other end of said bellows to move therewith in response to temperature change of said shell, a resistor mounted within said shell, the free end of said lever including a current conducting slider part, means positioning said current conducting slider part of said free end of said lever to slide over said resistor, a resistance wire positioned in intimate heat conducting contact with the said other end of said bellows and current conducting means including said resistance wire, said current conducting part of said lever and a part of said resistor varied in response to the movement of said lever by said bellows.

2. A modulating space thermostat, said thermostat including a shell adapted to be supported in a space in heat exchange relation with the air in said space and the exposed inner wall surfaces of said space, a fluid fill bellows having a free end and a fixed end sealed to the inner surface of said shell with the fluid fill of said bellows in contact with the inner surface of said shell, a lever, means pivoting said lever within said shell, said fluid fill variably positioning said free end of said bellows with respect to its said fixed end in response to the temperature condition of said shell, means biasing said lever toward said free end of said bellows to be moved thereby, a first resistor mounted within said shell, means adapting said free end of said lever to slide along said first resistor, a second resistor positioned in intimate heat conducting contact with the free end of said bellows and current conducting means including said second resistor, a part of said lever and a part of said first resistor varied in response to the movement of said lever by said bellows.

3. The thermostat of claim 1 including supporting means supporting said resistor on said shell, said supporting means including vertically extending heat radiating fin means positioned to receive heat by conduction from said resistor to dissipate said heat to the ambient air by convection and said supporting means including means for limiting the throw of said free end of said lever by said bellows.

4. The variably positioning means of claim 2 in which said thermostat includes means supporting said first resistor on said shell, said supporting means including vertically extending heat radiating means positioned to receive heat by conduction from said first resistor to dissipate said heat to the ambient air by convection and said supporting means including means for limiting the throw of said free end of said lever by said bellows.

5. A bellows type modulating thermostat for use in variably energizing an electric circuit in response to the temperature in a space, said thermostat comprising a base adapted to be mounted as desired in said space, said thermostat including a heat conducting shell removably secured to said base to extend into said space therefrom, a fluid fill bellows having a closed free end and a fixed end closed by sealing thereover a part of the inner surface of said shell with the fluid fill of said bellows in contact with said inner surface, a lever pivoted at one end to and within said shell, said free end of said bellows being variably positioned with respect to the fixed end thereof by said fluid fill in response to said temperature, means biasing said lever between its ends into contact with the free end of said bellows to be moved thereby, said rheostat being insulatedly mounted to and within said shell near the top thereof, means adapting the free end of said lever to slide along said rheostat to vary the resistance thereof in response to the movement of the free end of said bellows, and a resistor serially connected with said rheostat and positioned in intimate heat conducting contact with said bellows adjacent the free end thereof.

References Cited in the file of this patent

UNITED STATES PATENTS

| | | |
|---|---|---|
| 1,993,687 | Shivers | Mar. 5, 1935 |
| 1,994,771 | Knopp | Mar. 19, 1935 |
| 2,041,050 | Cunningham | May 19, 1936 |
| 2,059,362 | Kimball | Nov. 3, 1936 |
| 2,335,886 | Reutter | Dec. 7, 1943 |
| 2,338,563 | Andersson | Jan. 4, 1944 |